J. E. BILLINGTON.
TYPOGRAPHICAL COMPOSING MACHINE.
APPLICATION FILED DEC. 23, 1919.

1,373,942.

Patented Apr. 5, 1921.
6 SHEETS—SHEET 5.

Inventor.
John E. Billington
By
Rogers, Kennedy & Campbell
Attorneys.

UNITED STATES PATENT OFFICE.

JOHN ERNEST BILLINGTON, OF BROADHEATH, ENGLAND, ASSIGNOR TO LINOTYPE AND MACHINERY LIMITED, OF LONDON, ENGLAND.

TYPOGRAPHICAL COMPOSING-MACHINE.

1,373,942.   Specification of Letters Patent.   Patented Apr. 5, 1921.

Application filed December 23, 1919.   Serial No. 346,939.

*To all whom it may concern:*

Be it known that I, JOHN ERNEST BILLINGTON, a subject of the King of the United Kingdom of Great Britain and Ireland, and residing at Linotype and Machinery Works, Broadheath, in the county of Chester, England, have invented new and useful Improvements in Typographical Composing-Machines, of which the following is a specification.

This invention relates to improvements in typographical composing machines such as those known under the trade mark "linotype" and kindred machines, and especially those machines which, in addition to the ordinary or standard magazines, are provided with one or more auxiliary magazines arranged at one side of the ordinary magazines.

More particularly, the invention relates to machines of the kind just referred to in which provision is made for controlling the release of matrices from either the ordinary or the auxiliary magazines by the manipulation of a single keyboard, and it has for its object to provide improved means for so controlling the release of matrices, which means may be conveniently adapted for use in conjunction with ordinary and auxiliary magazines of varying constructions.

So far as the essence of the present invention is concerned, it matters not whether a machine embodying it be provided with one or a plurality of standard magazines and one or a plurality of auxiliary magazines. Moreover, when the respective pluralities are superposed columnwise, the invention is equally applicable to vertically adjustable and to stationary columns, and may be employed in conjunction with any of the standard arrangements by which delivery of matrices from desired magazines of the respective column is secured. The invention, however, necessarily involves the employment of at least one standard magazine and one auxiliary magazine arranged at one side thereof or, to employ the term recognized in the art, in "tandem" thereto.

The invention will now be more particularly described by reference to the accompanying drawings in which:—

Throughout the several figures of the drawings like references numerals and letters are used to indicate the same or corresponding parts.

Figure 1:
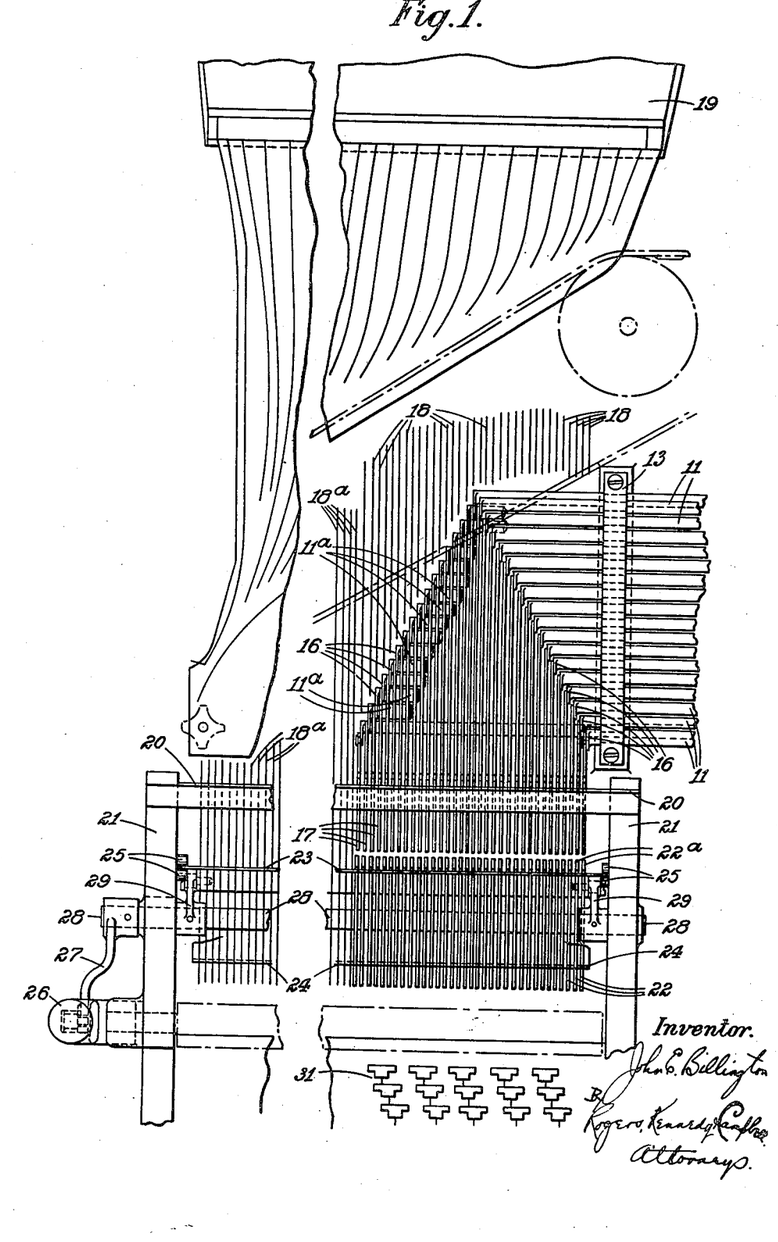
Figures 1 and 1ª together form a front elevation of sufficient of a typographical composing machine to illustrate one constructional form of the invention, the example here illustrated embodying one ordinary magazine and three auxiliary magazines, these latter being adjustable columnwise to bring any desired one of them into operative position.
Figure 1A:
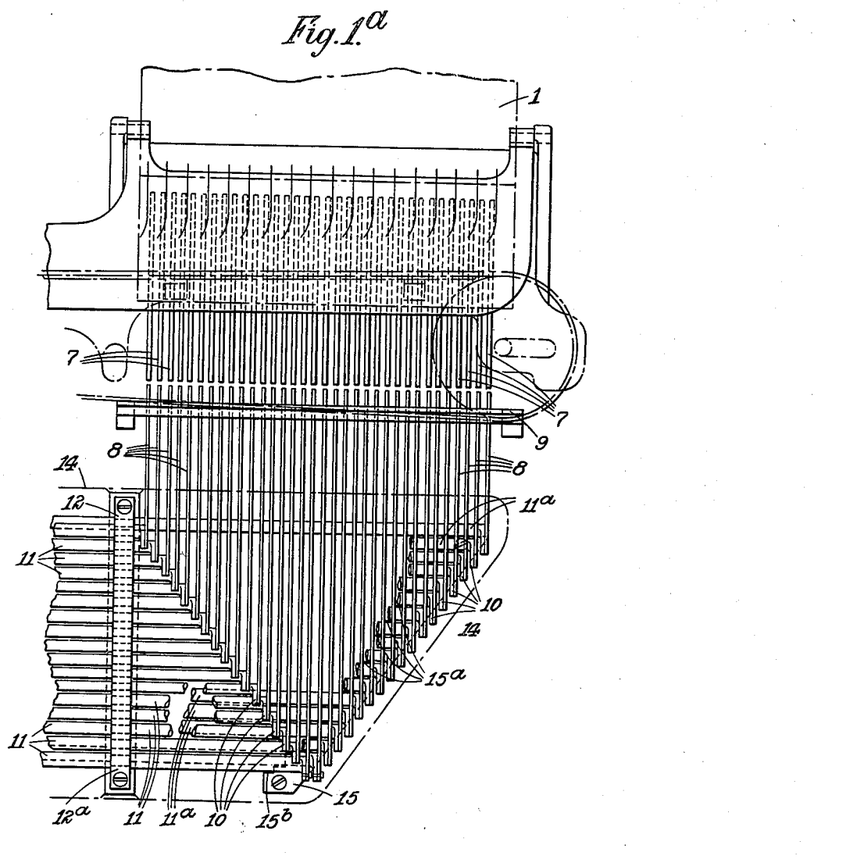

In applying the invention to a machine such as that illustrated in Figs. 1, 1ª and 2, wherein all the three superposed auxiliary magazines 1, 2, 3 are practically identical with each other, each channel of each such auxiliary magazine, is provided with an escapement 4 of well-known construction, for controlling the release of matrices 5 from said channel. The particular construction of escapement 4 represented in Fig. 2, comprises the usual two matrix-engaging pallets pivotally connected to an escapement lever which is actuated by a push rod or plunger, all of which devices are well-known and therefore call for no further detailed description.

The column of magazines 1, 2, 3, in well-known manner, is adjustable as a whole, so as to bring any desired one of such magazines into operative register with an assembler entrance 6 and at the same time bring the escapements of the selected magazine into operative register with the respective escapement-operating mechanism.

Figure 2:
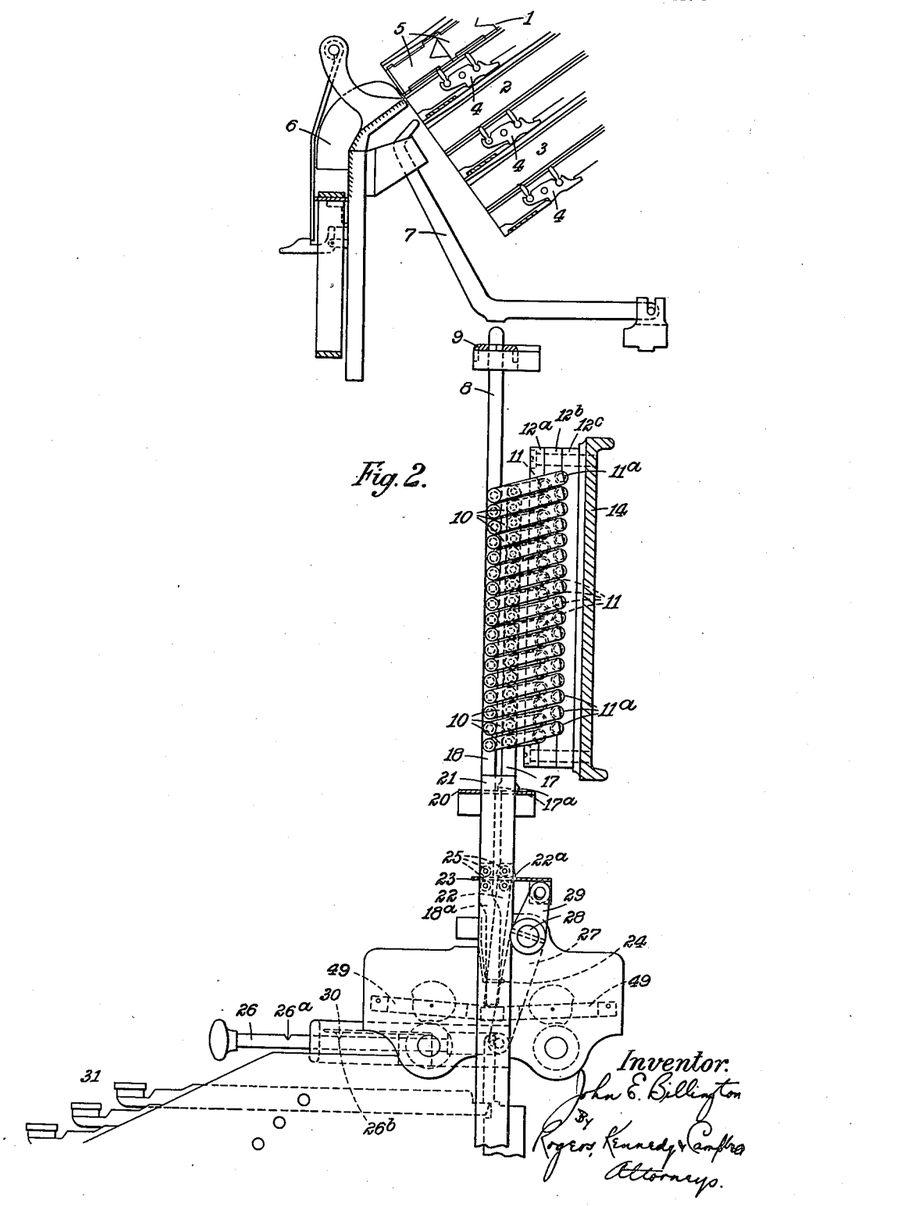
Fig. 2 is a side elevation as viewed from the right side of Fig. 1ª.

The escapement-operating mechanism for the auxiliary magazines may be of a construction similar to that of the corresponding mechanism for the ordinary magazine, and is shown by way of example in Fig. 2 as consisting of a bank of pivoted strikers 7, each of which is capable of being actuated by an escapement rod or reed 8 which, at its upper end, is guided in a stationary guide 9. According to the embodiment of the present invention now being dealt with, each reed 8 is, at its lower end, pivoted to a lever arm 10 fast to, or integral with, the righthand end of a horizontal rock shaft 11 or 11$^a$ there being as many of such shafts (thirty-four in the example under review) as there are matrix channels in each of the auxiliary magazines 1, 2, 3.

Figure 3:
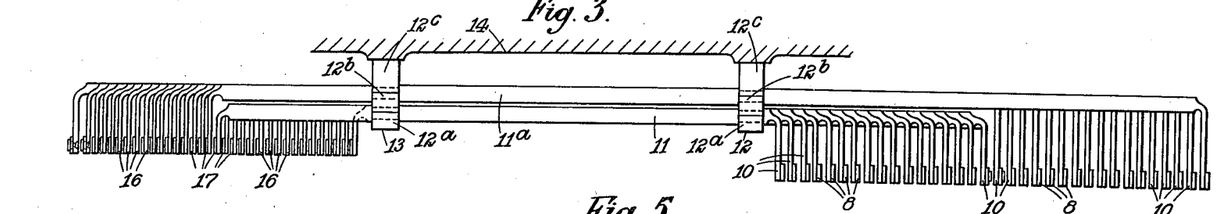
Fig. 3 is a view showing in plan certain motion-transmitting devices, to wit, rocking shafts, represented in Figs. 1, 1ª and 2.

To more conveniently accommodate the thirty-four rock shafts 11, 11$^a$ within the space available for them, these shafts are arranged in two vertical banks one behind the other, as shown best in Figs. 2 and 3, the shafts 11$^a$ of the rear bank being longer in both right and left direction than are the corresponding shafts 11 of the front bank as shown clearly in Figs. 1, 1$^a$, and 3, in the former of which figures, to avoid complication only the end portions of the shafts 11$^a$ are shown.

Each of the rock shafts 11, 11$^a$ is capable of rocking in two bearings 12, 13, these bearings being conveniently formed in the meeting faces of three stationary vertical bars respectively marked 12$^a$, 12$^b$, 12$^c$ in Figs. 2 and 3, the rearmost of which is, or may be, directly attached to the front of a fixed plate 14.

Figure 4:
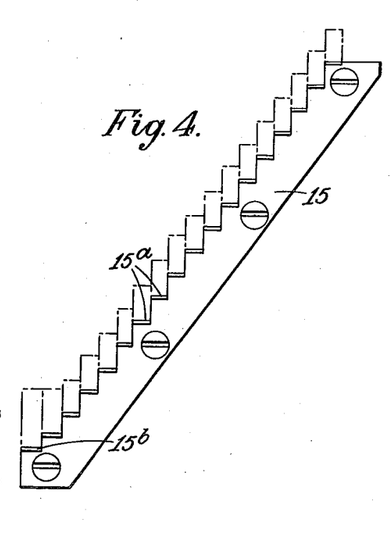
Figs. 4, 5 and 6 are respectively a front elevation, side elevation and plan of a supplemental shaft-support detached from the machine.
Figure 5:
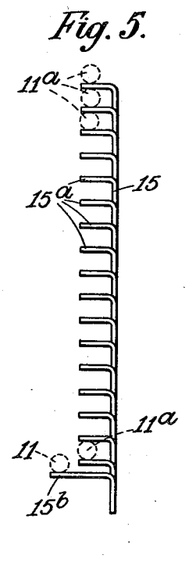
Figure 6:
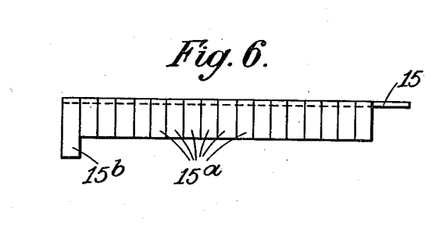

The rightwardly-extending ends of the rock shafts 11$^a$, that is to say the portions rightward of the bearings 12, may be supplementally supported on a bracket plate 15 rigidly secured to the before-mentioned fixed plate 14. As shown in Figs. 4, 5 and 6, the bracket plate 15 may be conveniently made of sheet metal, cut and bent, as shown diagrammatically in Fig. 4, to form a number of stepwise arranged forwardly-projecting arms or ledges 15$^a$ each for supporting one of the rock shafts 11$^a$ and, as shown diagrammatically in Fig. 5, preferably fitting snugly between adjacent shafts 11$^a$ so as to give both top and bottom support to those shafts. In the example illustrated, the bracket plate 15 is provided with a lowermost arm or ledge 15$^b$, longer than the other ones, which serves to support the lowermost of the rock shafts 11, as shown in Figs 1$^a$ and 5.

For convenience of description the rock shafts 11, 11$^a$ are all hereinafter designated by the reference numeral "11," excepting when it is required to distinguish between those of the before-mentioned front and rear banks.

Each of the thirty-four rock shafts 11, at its left-hand end, is provided with a lever arm 16 rigid thereon and pivoted to the upper end of a vertical key-rod 17 which is located immediately behind one of the escapement-rods 18 appertaining to the escapement-operating mechanism of the standard magazine 19, of which only a portion is shown in Fig. 1.

The escapement-rods 18 behind which are located the auxiliary key-rods 17, do not, like the remainder of the escapement-rods, which are distinguished by the reference numerals 18$^a$, extend directly down to the so-called cam carriages 49 (shown in dotted lines in Fig. 2) but are of curtailed length so that their lower ends are situated in, or approximately in, the same horizontal plane as are the corresponding ends of the auxiliary key-rods 17.

For the sake of clearness, the escapement-rods 18, 18$^a$ are each diagrammatically represented in Fig. 1, by a single line, and further, in that figure the curtailed escapement-rods 18 are not carried down at the front of the auxiliary key-rods 17, although, as above explained, the lower extremities of the key-rods 17 and escapement-rods 18 are co-terminous.

The auxiliary key-rods 17, and the lower ends of the curtailed escapement-rods 18 and full-length escapement-rods 18$^a$, are guided in a stationary horizontal slotted plate 20, fixed to two uprights 21, and the said auxiliary key-rods are provided with shoulders 17$^a$ which, by engaging with the upper surface of the plate 20, limit the descent of those key-rods; or this result may be obtained by devices other than the shoulders 17$^a$ and plate 20. Means, not shown in the drawings, but of any of the well-known constructions, are also provided for correspondingly limiting the descent of the escapement-rods 18, 18$^a$ in such manner as normally to support the curtailed escapement-rods 18 in a position in which their lower ends are, as aforesaid, co-terminous with those of the auxiliary key-rods 17, and the full-length escapement-rods 18 are in a position in which their lower ends are just clear of the respective cam carriages 49.

Beneath the two parallel banks of auxiliary key-rods 17 and curtailed escapement-rods 18, there is provided a bank of rods 22 conveniently formed with T-heads 22$^a$ as shown best in Fig. 2, and hereinafter termed "T-headed rods". The upper ends of the T-headed rods 22, are guided in a slotted plate 23 (shown in detail in Fig. 7) which is adjustable forwardly and backwardly so that the said rods can be readily brought into operative register with either the bank of auxiliary key-rods 17 (which is the condition obtaining in Fig. 2) or the bank of curtailed escapement-rods 18, according to whether matrices are to be released from an auxiliary magazine 1, 2 or 3, or from the standard magazine 19.

Figures 7, 9:
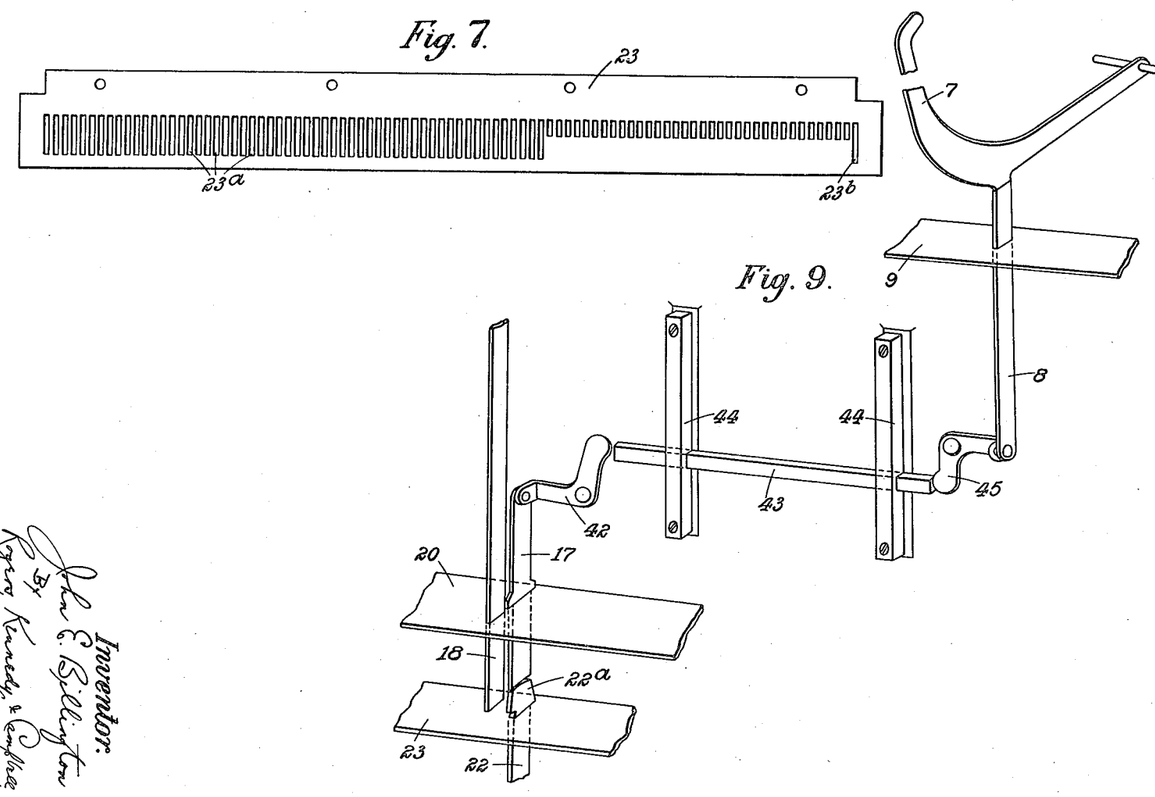
Fig. 7, is a plan of a sliding plate used for effecting a change from composing from an ordinary to an auxiliary magazine and *vice versa*.
Fig. 9 is a perspective view showing an alternative construction of motion-transmitting devices.

The T-heads 22ª of the rods 22 normally rest on the slotted plate 23 and serve to support these rods in such position that their feet are within operative distance, but just clear, of the respective cam-carriages 49, these rods, near their lower ends, are guided in a fixed plate 24 which also serves to guide the lower ends of the escapement-rods 18ª. These escapement-rods 18ª also traverse the adjustable slotted plate 23, but their position is not affected, by any forward or backward change of position of that plate, because the slots 23ª through which the said escapement-rods pass, as indicated in Fig. 7, are formed of sufficient length to attain that end; similarly with the escapement-rod (not shown in the drawings) appertaining to the space key, which rod passes through a slot 23ᵇ at the right end of plate 23.

The adjustable slotted plate 23, for ease of adjustment, may be guided between rollers 25 pivoted on the two uprights 21, and this plate is moved from one to the other of its two terminal positions by a manually-operable rod 26, pivotally connected to a lever arm 27 fast to a rock shaft 28 on which also are fast two upstanding arms 29 in pivotal connection with the said plate 23. The rod 26 is axially movable in a guide or guides mounted on the left-hand one of the two uprights 21, in or on which latter there are also provided bearings for the rock-shaft 28, while suitable means such as the spring detent 30, attached to the adjacent uprights 21, and notches 26ª, 26ᵇ in the rod 26, with which that detent engages, serve to retain the adjustable plate 23, against accidental displacement. The plate 23 may, however, be shifted otherwise than by the means just described, for instance it may be shifted by means of a pedal actuated by the operator or it may be shifted automatically by mechanism operated by devices controlled from the key-board 31, as for example in the manner described in Letters Patent No. 1,105,157 of 28th July, 1914.

The rock shafts 11 may conveniently be formed integral with their respective lever arms 10, 16 by constructing each of such shafts of a length approximating to that of the shaft proper, plus the length of both lever arms, milling to proper thickness the portions to form those arms, and drilling and bending the said portions, all as will be well understood by reference particularly to Fig. 3.

From the foregoing description it will be seen that when the T-headed rods 22 are (as they are shown to be in Fig. 2) in register with the bank of auxiliary key-rods 17, the actuation of a key of the keyboard 31 appertaining in common to that bank and to the curtailed escapement-rods 18, will effect the release of a matrix 5 from the respective channel of the particular magazine 1, 2 or 3 which, at the time, is in composing or operative position; when, alternatively, the T-headed rods 22 are in register with the curtailed escapement-rods 18, the actuation of the keys appertaining to those key-rods, will effect the release of matrices from the respective channels of the ordinary magazine 19.

Figure 8:
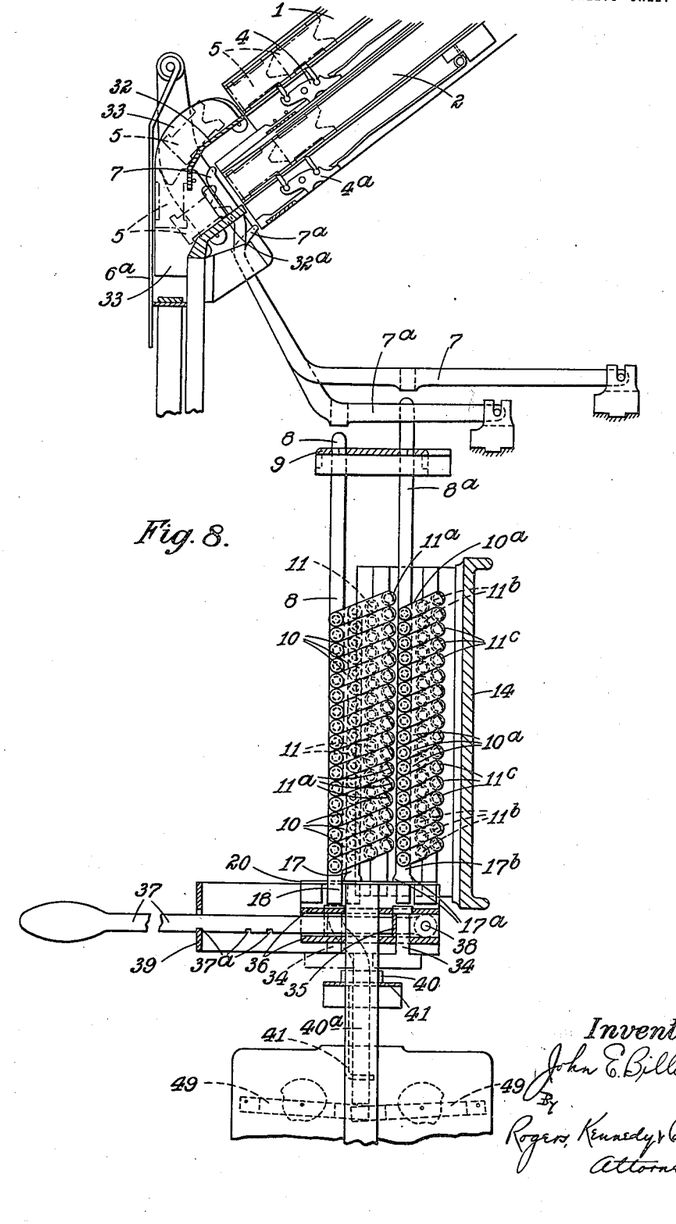
Fig. 8 is a side elevation of a second constructional form showing one way in which the invention can be applied to a machine having two non-adjustable superposed auxiliary magazines.

In the constructional form of the invention shown in Fig. 8, the two auxiliary magazines 1, 2 are non-adjustable and the escapements 4, 4ª thereof are operated by pivoted strikers 7, 7ª respectively, adapted to be operated by the respective set of auxiliary escapement reeds 8ª, 8. The assembler entrance 6ª is also non-adjustable, and is formed double, that is to say, with two platforms or chutes 32, 32ª for receiving the matrices released from the magazines 1, 2 respectively. This assembler entrance is, as ordinarily, divided by partitions 33 into separate channels, and as the pivoted strikers 7 appertaining to the upper magazine 1, range in front of the mouth of the lower magazine 2, the edges of those strikers which are presented toward that mouth, are chamfered to a knife edge to minimize the risk of obstructing the passage of matrices from that magazine. For a similar reason the rearwardly presented edges of the partitions 33, opposed to the magazines 1, 2, are similarly chamfered to a knife edge.

By comparing Fig. 8 with Fig. 2 it will be seen that so far as regards the auxiliary escapement reeds 8 and their operative connection, through the rock-shafts 11, 11ª with the respective auxiliary key-rods 17, the two arrangements are practically identical with each other. In the arrangement shown in Fig. 8, the auxiliary escapement reeds 8ª near their upper ends are guided in a stationary plate 9 (as also are the reeds 8) and, at their lower ends are pivoted to lever arms 10ª fast to the right-hand ends of horizontal rock-shafts 11ᵇ or 11ᶜ which, like the shafts 11, 11ª at the front of them, are arranged in two parallel vertical banks, there being as many of the shafts 11ᵇ, 11ᶜ as there are matrix channels in each of the auxiliary magazines 1, 2, all the said rock-shafts 11, 11ª, 11ᵇ and 11ᶜ being supported in bearings rigid on the fixed plate 14.

Each of the rock shafts 11ᵇ, 11ᶜ at its left-hand end, is provided with a lever arm which is not illustrated in Fig. 8, but is practically identical with one of the before-described arms 16, the said lever arm being pivoted to the upper end of a vertical key-rod 17ᵇ. Only one of the key-rods 17ᵇ is shown in Fig. 8, but as those key-rods are all substantially similar to the key-rods 17 shown in Figs. 1 and 2 (excepting as to their length below the guide plate 20) their general disposition will be well understood without further illustration.

In the example now under review, wherein the horizontal distance between the bank of curtailed escapement-rods 18 and the rearmost bank of auxiliary key-rods 17b, is greater than would admit of angularly adjustable T-headed rods (such as 22) being used satisfactorily for selectively actuating those rods, it is preferred to effect such actuation by the stems of a set of inverted T-shaped push rods 34 which are vertically slidable in a bar or carriage 35 which, itself, can be horizontally adjusted in fore-and-aft direction in fixed guides 36. To admit of the last-named adjustment, the carriage 35 has a handle 37 pivoted to it by a stud or studs 38, and by means of this handle, the stems of the push rods 34 can be brought into operative alinement alternatively with any of the three sets of rods 18, 17, 17b. The set of push rods 34 can be locked in its three operative positions by any suitable means, such for example as the three notches 37a in the handle 37, those notches being capable of engaging with a fixed guide or frame 39 and being so located as to attain the desired result.

The head at the lower end of each of the push rods 34, is of such length in fore-and-aft direction that some part thereof is always in the upward path of the head 40 of its respective T-headed rod 40a, which is capable of moving only vertically in upper and lower stationary guides 41. The heads 40 normally rest on the upper of the two guides 41 so as to support the feet of the rods 40a immediately over, but just out of contact with, the respective cam-carriages 49, and indeed in the same horizontal plane as that wherein terminate the lower ends of the full-length escapement-rods 18a.

From the immediately preceding description, it will be seen that when the push rods 34 are in the foremost position (in which they are shown in dot-and-dash lines in Fig. 8) their actuation, through the respective curtailed escapement-rods keys, operates the respective curtailed escapement-rods 18 and effects the release of matrices from the standard magazine, and when they are in their intermediate position, their actuation operates the respective auxiliary key-rods 17 and effects the release of matrices from the auxiliary magazine 2, and that when they are in their rearmost position (in which they are shown in full lines in Fig. 8), their actuation will operate the respective auxiliary key-rod 17b and effect the release of matrices from the auxiliary magazine 1.

Although it is preferred that each of the auxiliary magazines should be adaped to contain not less than thirty-four different matrices as would be provided for by the before described thirty-four rock shafts per magazine, the present invention is not to be regarded as limited in that direction as the said magazines may be arranged for containing more or less than the number mentioned and in a machine in which each auxiliary magazine is designed for containing thirty matrices, there may be three non-adjustable auxiliary magazines and the whole ninety standard escapement-rods may be of curtailed length and be divided into three groups, each, as far as regards its operation, alternating with the corresponding set of auxiliary escapement rods, and each capable of being brought into such operation merely by a single adjustment effected or controlled by the operator, in a manner which, from the foregoing, will be readily understood and which, for example, might be similar to, or an elaboration of, that before described in connection with Fig. 8.

The invention is not limited to the use of rock shafts such as those hereinbefore described, for transmitting motion from the auxiliary key-rods 17 or 17b to the escapement strikers, and as one example of such a variation, it may be pointed out that transmission devices such as those illustrated in Fig. 9, may be used. In this arrangement each of the auxiliary key-rods say 17, as exemplified, is pivotally connected to one arm of a bell-crank lever 42, whose other arm is in operative contact with the left-hand end of a push rod 43 which is horizontally-slidable in stationary guides 44. The right-hand end of the push rod 43 is in operative contact with one arm of a bell-crank lever 45 whose other arm is pivotally connected to the lower end of the respective auxiliary escapement rod 8 which is guided in a fixed plate 9 and, at its upper end, operatively engages with the respective striker 7. The bell-crank levers 42, 45, rock on stationary pivots fast to any suitable support such as the plate 14 (Figs. 2 and 8) on which also would be rigidly mounted the guides 44.

Another means for transmitting motion from the auxiliary key-rods 17 to the auxiliary escapement rods 8, comprises for each such rod, two levers of the first order, each at one end pivoted to the said key-rod and reed respectively, and at their other ends mutually engaging with each other by a gear-tooth connection.

In certain machines it may be desirable to use auxiliary magazines each having the same or practically the same number of channels as there are channels in an ordinary magazine and in such a machine the embodiment of the present invention would involve the transfer of control exercised by a corresponding number of keys of the keyboard when effecting a change of composition from an ordinary magazine to an auxiliary magazine and vice versa.

In the embodiments herein illustrated, as previously noted, each auxiliary magazine is provided with but thirty-four different matrix channels, and hence only that particular number of finger keys is affected in changing from one magazine to another. The remaining keys of the keyboard are maintained in constant connection with the corresponding escapement actuating reeds of the ordinary magazine so as to effect the release of the appropriate matrices from such ordinary magazine irrespective of the operative condition of the other keys. In other words, the present arrangement is such that the keyboard may be operatively connected as a whole to the ordinary magazine or in part to said magazine and in part to the auxiliary magazine; or more broadly speaking, the arrangement is such that the keyboard may be connected as a whole to one of two magazines or in part to each of said magazines, as desired. This arrangement is particularly advantageous in that it enables matrices to be drawn from two different magazines simultaneously under certain useful conditions, without necessitating any change from one to the other as heretofore required.

Having described my invention, I declare that what I claim and desire to secure by Letters Patent is:—

1. In a typographical composing machine the combination with an ordinary magazine and an auxiliary magazine arranged in tandem thereto, of a bank of escapement-operating reeds for the ordinary magazine, a keyboard controlling the actuation thereof, a bank of escapement-operating reeds for the auxiliary magazine, motion transmission devices adapted to transmit motion to the last-mentioned escapement-operating reeds independently of the first-mentioned escapement operating reeds, and means adapted to transfer the control exercised by the keyboard from the first-mentioned escapement-operating reeds to the motion-transmission devices.

2. In a typographical composing machine the combination with an ordinary magazine and an auxiliary magazine arranged in tandem thereto, of a bank of escapement-operating reeds for the ordinary magazine, a keyboard controlling the actuation of the full complement of such reeds, a bank of escapement-operating reeds for the auxiliary magazine, motion transmission devices adapted to transmit motion to the last-mentioned escapement-operating reeds, and means adapted to transfer only part of the control exercised by the keyboard from the first-mentioned escapement-operating reeds to the motion-transmission devices.

3. In a typographical composing machine having an ordinary magazine and a plurality of stationary auxiliary magazines arranged in tandem thereto, each magazine having its own escapements, the combination with a keyboard normally controlling the actuation of the full complement of escapements of the ordinary magazine, of means whereby only part of the control thus exercised can be transferred alternatively to the control of the escapements of respectively different auxiliary magazines and vice versa.

4. In a typograpical composing machine the combination with an ordinary magazine, an auxiliary magazine arranged in tandem thereto, a set of escapements for each magazine, a bank of escapement reeds each for actuating the respective escapement of the ordinary magazine but without effect on the escapements of the auxiliary magazines, and a keyboard normally controlling the actuation of the escapements of the ordinary magazine, of a series of auxiliary escapement rods one for each of the escapements of the auxiliary magazine, a motion-transmission device in permanent operative connection with each of the auxiliary escapement rods and adapted to be actuated independently of the first-mentioned escapement reeds, and switch mechanism controlled by the operator for diverting control exercised by the keyboard from escapement reeds of the ordinary magazine to the motion-transmission devices connected with the auxiliary escapements, and vice versa.

5. In a typographical composing machine the combination with an ordinary magazine and an auxilary magazine arranged in tandem thereto, and a set of escapements for each magazine, of a bank of ordinary and curtailed escapement reeds in operative relationship to the escapements of the ordinary magazine, a series of key-controlled devices acting on the ordinary escapement reeds directly and on the curtailed escapement reeds indirectly for actuating the respective escapements, a bank of auxiliary key-rods adjacent to the curtailed escapement reeds in operative relationship to the escapements of the auxiliary magazine, and a series of rods adjustable by the operator to place the key-controlled devices into engagement alternatively with the curtailed escapement reeds and the auxiliary key-rods.

6. In a typographical composing machine, the combination of an ordinary magazine provided with escapements, an auxiliary magazine arranged in tandem thereto and provided with escapements, a bank of escapement operating reeds for each magazine, a keyboard normally connected to the escapement operating reeds of the ordinary magazine, laterally offset devices through which the escapement operating reeds of the auxiliary magazine are operated, and means for disconnecting the keyboard, at least in part, from the escapement operating reeds of the ordinary magazine and connecting it to said laterally offset devices and vice versa, as desired.

7. In a typographical composing machine, the combination of two magazines arranged in tandem, and each provided with escapements, a bank of escapement operating reeds for each magazine, a keyboard normally connected to the escapement operating reeds of one magazine, laterally offset devices through which the keyboard may be connected to the escapement operating reeds of the other magazine independently of the first-mentioned reeds, and means to control the connection of the keyboard, as desired.

8. In a typographical composing machine, the combination of two magazines, arranged in tandem, and each provided with escapements, a keyboard common to both magazines, and means whereby the keyboard may be operatively connected as a whole to one magazine or in part to each magazine, as desired; whereby the manipulation of said keyboard will effect the release of matrices from one magazine alone, or from both magazines simultaneously.

9. In a typographical composing machine, the combination of two magazines arranged in tandem and each provided with escapements, a keyboard normally connected as a whole to one magazine, and means whereby the keyboard may be operatively connected in part to the other magazine while maintaining its operative connection in part to the first-mentioned magazine.

10. In a typographical composing machine, the combination of two magazines each provided with escapements, a keyboard common to both magazines, and means whereby the keyboard may be operatively connected as a whole to one magazine, or in part to each magazine, as desired; whereby the manipulation of the keyboard will effect the release of matrices from one magazine alone, or from both magazines simultaneously.

In testimony whereof I have affixed my signature hereto.

JOHN ERNEST BILLINGTON.